Oct. 23, 1951    M. W. ORTENBURGER    2,572,656
BLIND FLYING DEVICE
Filed Aug. 16, 1949
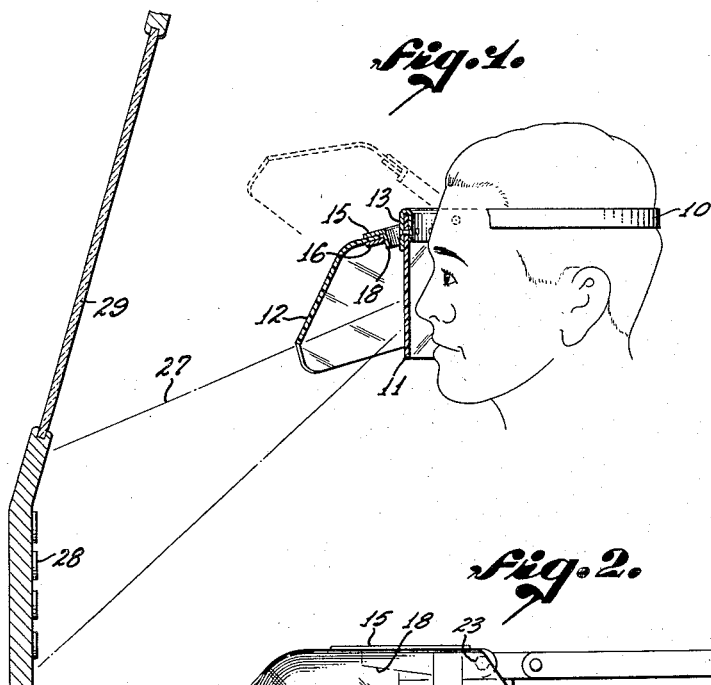
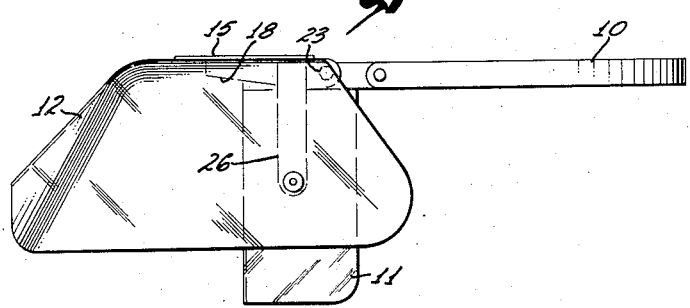
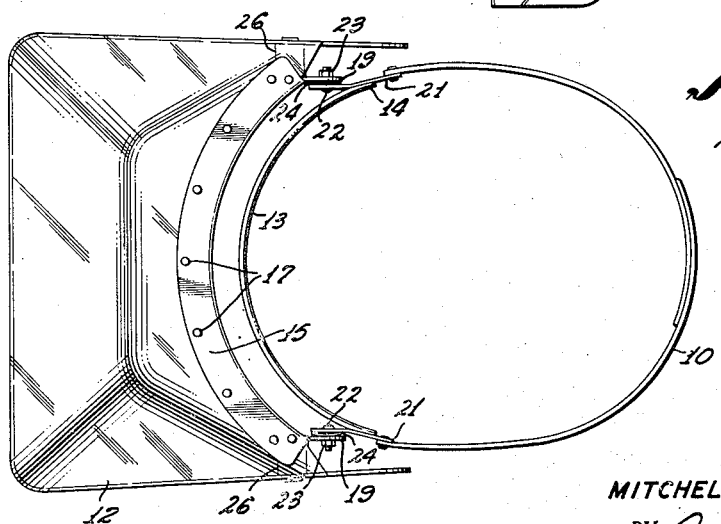
INVENTOR:
MITCHELL W. ORTENBURGER.
BY
ATTORNEY.

Patented Oct. 23, 1951

2,572,656

UNITED STATES PATENT OFFICE 2,572,656

BLIND FLYING DEVICE

Mitchell W. Ortenburger, Los Angeles, Calif.

Application August 16, 1949, Serial No. 110,656

5 Claims. (Cl. 35—12)

This invention relates to devices to be worn by pilots undergoing in actual flight blind flying or instrument training.

It is now the present practice, whenever a pilot is undergoing blind flying or instrument training, to cover the windows of the cockpit of the airplane with panels of a suitable material such as one of the acrylic plastics. The panels are of a color which passes but a part of the spectrum, and, although colored, are sufficiently transparent to permit the instructor to view the horizon and landing strip which the pilot is to take off from and land on during his training flight.

The pilot undergoing training is fitted or supplied with a pair of goggles or the like which contain lenses of a color which absorbs the light which is passed by the colored panels secured across the cockpit windows. The goggle lenses are sufficiently transparent to permit the pilot to view his instruments and other control instrumentalities within the cockpit but as the lenses will not transmit the colored light transmitted by the colored panels, the pilot is unable to see out of the cockpit. The pilot is therefore forced to fly blind or solely by instrument.

This prior practice has several inherent disadvantages and is not liked by either the pilot or the instructor. Pilots do not like it, for the instruments are of course illuminated by the light transmitted through the panels and are not easily read when viewed through the goggle lenses. The goggles must very closely fit about the pilot's eyes, and this gives rise to fogging of the interior surfaces of the goggle lenses due to moisture condensation thereon. The goggles are hot and are uncomfortable to wear, particularly during the warm weather.

Under emergency conditions caused by error of the pilot undergoing instrument flight training the pilot must remove the goggles before he can attempt to avert a crash by actually viewing the flight hazard or altitude of the airplane relative to the earth's surface. This is oftentimes difficult to do, for the pilot may be forced to use his hands in the operation of the airplane and cannot remove the goggles even though the instructor is urging him to do so.

The instructor must view the horizon and flight conditions through the colored panels, which, although substantially transparent, do absorb a relatively large percentage of the light incident thereon. The instructor's vision is therefore also impaired, and this is particularly so under poor weather conditions.

Another disadvantage arises through the use of the panels covering the cockpit windows, as the panels must be especially fitted to a particular airplane. Thus, where a pilot is undergoing tests in three different types of airplanes there must be three different sets of panels. This is not only costly but creates a storage problem.

The use of the device of the present invention eliminates all of the disadvantages of the previously proposed method of teaching instrument flying, for the device is worn only by the pilot and the instructor's vision is in no way impaired. The device comprises, in the broadest aspects thereof, a pair of transparent filters adapted to be disposed in front of and around the eyes of the pilot. The filters are so arranged that a pilot with his head in the normal flying position within the cockpit views the horizon and ambient flight path of the airplane through both filters and views the instrument panel through but one filter. The filters have such optical characteristics that light transmitted by the one filter will not pass through the other so that the pilot's vision through both filters is, in effect, optically blocked.

The filters, if desired, may be formed of shaped sheet-like members of colored transparent material such as used for the panels employed to cover the windows of the cockpit in the previously proposed blind flying installations. The outer filters may, for example, be formed of a blue material which will pass only light within a certain wave length range, while the inner filter may be formed of a material having a color which will only transmit light of the wave length absorbed by the outer filter. Such an arrangement would form a "chromatic block" and the pilot is blind as long as he attempts to view objects through both filters.

The filters, on the other hand, could be formed of shaped, sheet-like members of that polarizing material sold under the trade name "Polaroid." If this material is used to form the filters, the sheet-like members should be so arranged that the plane of vibration of the plane polarized light passed through the outer filter is normal to the plane of vibration of the light plane polarized by the inner filters. With such an arrangement, plane polarized light emerging from the first filter would be extinguished by the second filter and the pilot again is not able to view objects through both filters.

In the now preferred embodiment of the device of the present invention the inner filter is somewhat cylindrical in shape and is held by a suitable support mounted to the pilot's head in a position in front of the face of the pilot. The inner filter is of a sufficient size so as to extend around both sides of the pilot's head and completely fills the visual field of the pilot. The pilot views the instruments through the lower part of this filter and sees ambient objects through the upper portion of the filter. As the pilot views the instruments through but one filter, which is illuminated by the light entering the cockpit through the unobscured windows of the same, the instruments are clearly seen.

The second filter is pivotally mounted to the support and is adjustable so that it can be moved to such a position relative to the first or inner filter that the pilot is forced to look through both filters if he raises his eyes from the instrument panel to view ambient objects exterior of the airplane. The second filter, obviously, must also extend around the opposite sides of the pilot's head to obstruct the pilot's vision if he attempts to look "out of the corner of his eye."

The device of the present invention, as the filters are spaced from the face of the pilot, does not "fog up" nor does it cause any discomfort to the pilot even in warm weather. Any time the pilot must see through the windows of the cockpit he can do so by merely tilting his head a distance sufficient to move the outer filter out of his line of vision. Thus, in emergencies the pilot can if necessary see through the windows of the cockpit without removing his hands from the controls of the airplane.

The device of the present invention can be used to train any pilot in any airplane by merely adjusting the position of the outer filter relative to the inner filter. Thus the storage problem created by the multiple panels heretofore used to cover the windows of the cockpit is not present in the use of the device of the present invention.

Other features and advantages of the present invention will be hereinafter apparent from the following description, particularly when taken in connection with the accompanying drawing, in which:

Figure 1 is an elevational view partly in section of the device of the present invention being worn by a pilot undergoing instrument training;

Figure 2 is a side elevational view of the device; and

Figure 3 is a top plan view of the same.

The device of the present invention, referring now to the drawing, comprises a suitable support 10 adapted to be mounted to the head of the pilot undergoing training. The head engaging support member 10, here shown merely as a head encircling band, may take any form desired as long as it will adequately support the filters 11 and 12 in front of the pilot's face. The filter 11, in the illustrated embodiment of the present invention, is mounted to the support 10 by inserting the upper edge thereof between the legs of a U-shaped, arcuate band 13, after which suitable fastening elements, such as rivets, are passed through aligned openings in the legs of the band and the filter to permanently mount the latter to the band 13. The opposite ends of one leg of the band 13 are laterally extended to form a pair of oppositely projecting tabs 14 which are rigidly and permanently secured to the support 10.

The filter 11 is preferably formed of a sheet of a material sufficiently thin to permit the sheet to take the shape of the arcuately arranged band 13. The sheet from which the filter 11 is formed should be sufficient width to extend not only in front of the pilot's face but around the opposite sides of the head as well. The sheet furthermore should be of a length such that the latter will extend vertically in front of the pilot's face a distance sufficient to completely fill the field of vision of the pilot as he moves his eyes vertically.

The filter 12 is hood-like in shape and extends outwardly and downwardly around the filter 11. In the illustrated embodiment of the present invention the one edge of the filter 12 is secured between a pair of plates 15 and 16 by fastening means 17, such as rivets, which clamp the plates 15 and 16 together with the one edge of the filter 12 therebetween. The plate 15 carries at its inner edge a downwardly extending flange 18 which reenforces the secured edge of the filter 12 and also forms the means for pivotally mounting the filter to the support 10.

The pivotal mounting is brought about by extending the opposite ends of the flange 18 to form small tabs or ears 19 which are mounted to small plates 21 carried at opposite sides of the support 10 and which project outwardly from the forehead of the pilot when the device is worn. The pivotal connection may be brought about by any means desired, although in the form of the invention illustrated, small bolts 22 are passed through aligned openings in the tabs or ears 19 and the plates 21 to receive nuts 23. A spring washer 24 or the like may be interposed between the adjacent faces of the tabs 19 and the plates 21 to resist pivotal movement of the tabs 19 to the end that the filter 12 may be moved to some desired position relative to the filter 11 and will be held in that position by the resistance created by the spring washer 24.

To reenforce and to support the downwardly and sidewardly extending edge portions 25 of the filter 12, small angle brackets 26 carried by the plate 16 extend downwardly therefrom and are rigidly secured adjacent their lower ends to the edge portions 25. These brackets, although they may be within the visual field of the pilot, cannot be seen by him, as will hereinafter be apparent.

In the use of the device of the present invention, the head engaging member 10 is secured in position on the head of the pilot substantially as shown in Figure 1. With the head engaging member in position on the head of the pilot the filter 11 is disposed in front of the face of the pilot and completely fills his visual field. The filter 12 is so pivotally adjusted relative to the filter 11 that the lower edge thereof lies in a plane indicated by the line 27. With the filter 12 in this position the pilot, with his head in the normal flying position within the cockpit, must view objects disposed exteriorly of the airplane through both filters 11 and 12. By merely turning his eyes downwardly, however, he is able to view the instrument panel 28 of the airplane disposed just below the windshield 29 through but the lower edge of the filter 11. As the edge portions 25 of the filter 12 extend downwardly at opposite sides thereof the pilot is unable to "see out of the corner of his eye" through windows arranged at opposite sides of the windshield. Light passed through the filter 12 will not pass through the filter 11, so that as long as the pilot holds his head level, his vision through the windshield and other windows of the cockpit is blind or blocked so that he is unable to view the horizon or his flight path. He is able, however, to view the instruments of the panel 28, as light rays from the instruments thereof will pass into his eyes through the lower portion of the filter 11.

In one embodiment of the device of the present invention the filter 12 may be formed of a shaped, sheet-like member of a relatively thin plastic material which, although transparent, is of a color which transmits only one end of the color band, for example, light within a range of wave lengths of 4000–5000 Angstrom units. The filter 11, in this embodiment of the device of the present invention, is formed of a similar material but of a color which transmits the opposite end of the color band, for example, light having a wave length within the range of 5500–7000 Angstrom units. The filter 12 may be, for example, violet or blue in color, while the filter 11 may be red or orange in color. As the filter 11 will not pass or transmit light of the wave length which will pass the filter 12 substantially all of the light incident on the filter 12 is absorbed in passing through the two filters.

In another embodiment of the present invention the filters 11 and 12 may be formed of that substantially transparent, polarizing material in sheet form sold under the trade name "Polaroid." In this embodiment of the invention the polarizing material would be so mounted before the pilot's eyes that the plane of vibration of the plane polarized light passed through the filter 12 would be perpendicular to the plane of vibration of the light polarized by the filter 11. In such an arrangement of the filters, plane polarized light emerging from the filter 12 would be extinguished by the filter 11, so that again substantially no light entering through the windows of the cockpit would enter the pupil of the pilot's eye.

It should now be understood that in either embodiment of the present invention, with the filter 12 mounted as shown in Figure 1 the pilot, although free to view the instruments, is unable to see through the windshield 29 and consequently is forced to fly blind or solely on instruments. The instructor, of course, is not fitted with a device of the present invention, so that his vision is in no way impaired, for there is nothing obscuring the windshields of the windows of the cockpit. The pilot is able to see the instruments of the panel 28 much more clearly than in the previously proposed system of blind flying instruction, for the same are illuminated by heterochromatic light entering the cockpit through the unobscured windows and are viewed by the pilot through the one filter only.

In cases of emergency the pilot by merely tilting his head upwardly is free to view the horizon through the windshield 29. This is so, because in tilting his head both filters 12 are moved upwardly to a position in which the pilot is able to view the windshield and other windows of the cockpit through but the inner filter 11. If a pilot is able, he may, by a mere upward sweep of his hand, pivotally move the filter 12 to the position shown in broken lines in Figure 1, in which case he will be able to see through the windshield 29 without tilting his head.

As the filter 11 is spaced outwardly from his face, air may circulate between the filter and the face of the pilot to eliminate any discomfort such as that caused by the closely fitting goggles of the previously proposed blind flying installations. As air may circulate between the filter and the face of the pilot, there is no danger of the filter fogging by condensation of moisture thereon.

Although the now preferred embodiments of the present invention have been shown and described herein, it is to be understood that the invention is not to be limited thereto, for it is susceptible to changes in form and detail within the scope of the appended claims.

I claim:

1. A training device to be worn by a pilot undergoing instrument training in flight, comprising: support means adapted to be mounted to the head of the pilot; a first filter formed of a curved sheet of a substantially transparent, light polarizing material; means for fixedly supporting said filter to said support means whereby the latter extends in front of and around the opposite sides of the face of the pilot; a second filter formed of a substantially transparent, light polarizing material; means for pivotally mounting said second filter to said support means for angular adjustment relative to said first filter whereby said second filter can be moved to a position angularly extending outwardly from said first filter with the lower edge thereof lying in a plane passing through the pilot's eyes and the upper edge of the instrument panel of the airplane, whereby the pilot views said panel through the lower edge of said first filter and the windshield of the airplane through both filters; said filters being so oriented with respect to each other that light entering said airplane through said windshield and directed into the eyes of the pilot is plane polarized by transmission through said second filter and extinguished by said first filter.

2. A training device to be worn by a pilot undergoing instrument training in flight, comprising: a support member adapted to be mounted to the head of the pilot; a first filter formed of a concave-convex sheet of a substantially transparent, light polarizing material; means for fixedly mounting said filter to said member to extend in front of the face of the pilot with the concave side adjacent the pilot's face, said sheet being of a size sufficient to extend across the face of the pilot and around the opposite sides of the head of the pilot; a second filter formed of a substantially transparent, light polarizing material; means for pivotally mounting the inner edge portion of said second filter to said supporting means for angular adjustment relative to said first filter; said second filter being hood-like in shape and having opposite edge portions extending therefrom; said second filter being movable to a position angularly extending outwardly from said first filter in which the outer edge of said second filter lies in a plane passing through the pilot's eyes and the upper edge of the instrument panel of the airplane, whereby the pilot views said panel through the lower edge of said first filter and the windshield of the airplane through both filters; the axes of said filter being so oriented with respect to each other that the plane of vibration of light polarized by said second filter is substantially perpendicular to the plane of vibration of light polarized by said first filter whereby light entering said airplane through the windshield thereof and plane polarized by passage through said second filter is extinguished at said first filter thereby blocking the pilot's view through said windshield.

3. A device to be worn by a pilot undergoing instrument training, comprising: support means adapted to be mounted to the head of the pilot; a light filter capable of passing light of one characteristic; means for fixedly mounting said filter to said support means to extend in front of the eyes of the pilot; said filter being of sufficient width and depth to cover the visual field of the pilot; a second filter capable of passing light of a second characteristic; means for mounting said second filter to said support means for angular movement relative to said first filter, said second filter being angularly movable to a position in which light rays, emanating from objects lying below a predetermined level relative to the eyes of the pilot and disposed below the windows of the cockpit, pass through said first filter, and in which light rays emanating from objects above said level pass through both filters, whereby light rays passing through said second filter will not pass through said first filter, thereby blinding the pilot to light rays entering the cockpit through said windows.

4. A device to be worn by a pilot undergoing instrument training, comprising: support means adapted to engage the head of a pilot; a first filter comprising a curved sheet of transparent material capable of passing light of one characteristic; means for fixedly mounting said filter to said support means to extend in front of and around the eyes of the pilot, said filter being of sufficient width and depth to cover both eyes of the pilot; a second filter comprising a hood-like member of transparent material capable of passing light of a second characteristic; means for mounting said second filter to said support means for angular movement relative to said first filter; said second filter being angularly movable to a position in which light rays emanating from objects lying below a predetermined level relative to the eyes of the pilot are not intersected by said second filter and enter the eyes of the pilot after passage through said first filter; in said position light rays emanating from objects above said level pass through both filters prior to entering the eyes of the pilot, whereby light rays passing through said second filter will not pass through said first filter.

5. A device to be worn by a pilot undergoing instrument training, comprising: support means adapted to engage the head of a pilot; a first filter comprising a curved sheet of transparent material capable of passing only light of a wave length within the range of 5500-7000 Angstrom units; means for fixedly mounting said filter to said support means to extend in front of and around the eyes of the pilot, said filter being of sufficient width and depth to cover both eyes of the pilot; a second filter comprising a hood-like member of transparent material capable of passing only light of a wave length within the range of 4000-5000 Angstrom units; means for mounting said second filter to said support means for angular movement relative to said first filter; said second filter being angularly movable to a position in which light rays emanating from objects lying below a predetermined level relative to the eyes of the pilot are not intersected by said second filter and enter the eyes of the pilot after passage through said first filter; in said position light rays emanating from objects above said level must pass through both filters prior to entering the eyes of the pilot, whereby light rays of the wave length passing through said second filter will not pass through said first filter thereby blinding the pilot to light rays emanating from objects above said level.

MITCHELL W. ORTENBURGER.

REFERENCES CITED

The following references are of record in the file of this patent:

UNITED STATES PATENTS

| Number | Name | Date |
|---|---|---|
| 2,368,117 | Damian | Jan. 30, 1945 |
| 2,403,195 | Ross | July 2, 1946 |
| 2,419,649 | Lieg | Apr. 29, 1947 |
| 2,433,164 | Shields | Dec. 23, 1947 |

FOREIGN PATENTS

| Number | Country | Date |
|---|---|---|
| 496,092 | Great Britain | Nov. 24, 1938 |
| 577,931 | Great Britain | June 6, 1946 |
| 607,217 | Great Britain | Aug. 27, 1948 |

OTHER REFERENCES

Aero Digest of July 1943, page 295.